US012732332B2

(12) United States Patent
Yin et al.

(10) Patent No.: US 12,732,332 B2
(45) Date of Patent: Sep. 8, 2026

(54) METHODS OF COLLISION RESOLUTION BETWEEN MULTIPLE HIGH PRIORITY HARQ-ACKs AND A HIGH PRIORITY PUSCH

(71) Applicant: SHARP KABUSHIKI KAISHA, Sakai City (JP)

(72) Inventors: Zhanping Yin, Vancouver, WA (US); Kai Ying, Vancouver, WA (US); Kazunari Yokomakura, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 256 days.

(21) Appl. No.: 18/693,305

(22) PCT Filed: Sep. 13, 2022

(86) PCT No.: PCT/JP2022/034185
§ 371 (c)(1),
(2) Date: Mar. 19, 2024

(87) PCT Pub. No.: WO2023/048015
PCT Pub. Date: Mar. 30, 2023

(65) Prior Publication Data

US 2025/0007670 A1 Jan. 2, 2025

Related U.S. Application Data

(60) Provisional application No. 63/247,761, filed on Sep. 23, 2021.

(51) Int. Cl.
*H04L 5/00* (2006.01)
*H04W 72/1268* (2023.01)

(52) U.S. Cl.
CPC ....... *H04L 5/0055* (2013.01); *H04W 72/1268* (2013.01)

(58) Field of Classification Search
CPC ............... H04L 5/0055; H04L 1/1664; H04W 72/1268; H04W 72/566
See application file for complete search history.

(56) References Cited

U.S. PATENT DOCUMENTS

| | | | | |
|---|---|---|---|---|
| 2022/0124745 A1* | 4/2022 | Yang | H04L 1/1671 | |
| 2023/0082996 A1* | 3/2023 | Sarkis | H04L 1/1854 | 370/329 |

FOREIGN PATENT DOCUMENTS

WO 2020/059671 A1 3/2020

OTHER PUBLICATIONS

NTT Docomo, Inc., "Discussion on intra-UE multiplexing/prioritization for Rel, 17 URLLC", R1-2107854, 3GPP TSG RAN WG1 #106-e e-Meeting, Aug. 16-27, 2021.

* cited by examiner

*Primary Examiner* — Marisol Figueroa
(74) *Attorney, Agent, or Firm* — ScienBiziP, P.C.

(57) ABSTRACT

A user equipment (UE) is described. The UE includes circuitry configured to determine that a physical uplink shared channel (PUSCH) with high priority (HP) overlaps with multiple HP physical uplink control channels (PUCCHs) carrying HP hybrid automatic repeat request-acknowledgements (HARQ-ACKs). The circuitry is also configured to concatenate the HP HARQ-ACKs of the overlapping HP PUCCHs into a joint HARQ-ACK codebook. The circuitry is additionally configured to multiplex the concatenated HP HARQ-ACKs on the HP PUSCH.

3 Claims, 13 Drawing Sheets

METHODS OF COLLISION RESOLUTION BETWEEN MULTIPLE HIGH PRIORITY HARQ-ACKs AND A HIGH PRIORITY PUSCH

CROSS REFERENCE

This Nonprovisional application claims priority under 35 U.S.C. § 119 on provisional Application No. 63/247,761 on Sep. 23, 2021, the entire contents of which are hereby incorporated by reference.

TECHNICAL FIELD

The present disclosure relates generally to communication systems. More specifically, the present disclosure relates to methods of collision resolution between multiple high priority hybrid automatic repeat request-acks (HARQ-ACKs) and a high priority physical uplink shared channel (PUSCH).

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE), comprising: circuitry configured to: determine that a physical uplink shared channel (PUSCH) with high priority (HP) overlaps with a HP physical uplink control channels (PUCCHs) carrying HP hybrid automatic repeat request-acknowledgements (HARQ-ACKs); the UE does not expect to transmit another PUCCH carrying HP HARQ-ACK that overlaps with the HP PUSCH; and multiplex the overlapping HP HARQ-ACK on the HP PUSCH.

In one example, a base station (gNB), comprising: receiving circuitry configured to: determine that a physical uplink shared channel (PUSCH) with high priority (HP) overlaps with a HP physical uplink control channels (PUCCHs) carrying HP hybrid automatic repeat request-acknowledgements (HARQ-ACKs); do not schedule another PUCCH transmission with HP HARQ-ACK that overlaps with the HP PUSCH; and receive the HP PUSCH, wherein the HP PUSCH comprises the HP HARQ-ACK of the overlapping PUCCH.

In one example, a method by a user equipment (UE), comprising: determining that a physical uplink shared channel (PUSCH) with high priority (HP) overlaps with a HP physical uplink control channels (PUCCHs) carrying HP hybrid automatic repeat request-acknowledgements (HARQ-ACKs); the UE does not expect to transmit another PUCCH carrying HP HARQ-ACK that overlaps with the HP PUSCH; and multiplexing the overlapping HP HARQ-ACK on the HP PUSCH.

DESCRIPTION OF EMBODIMENTS

Figure 1:
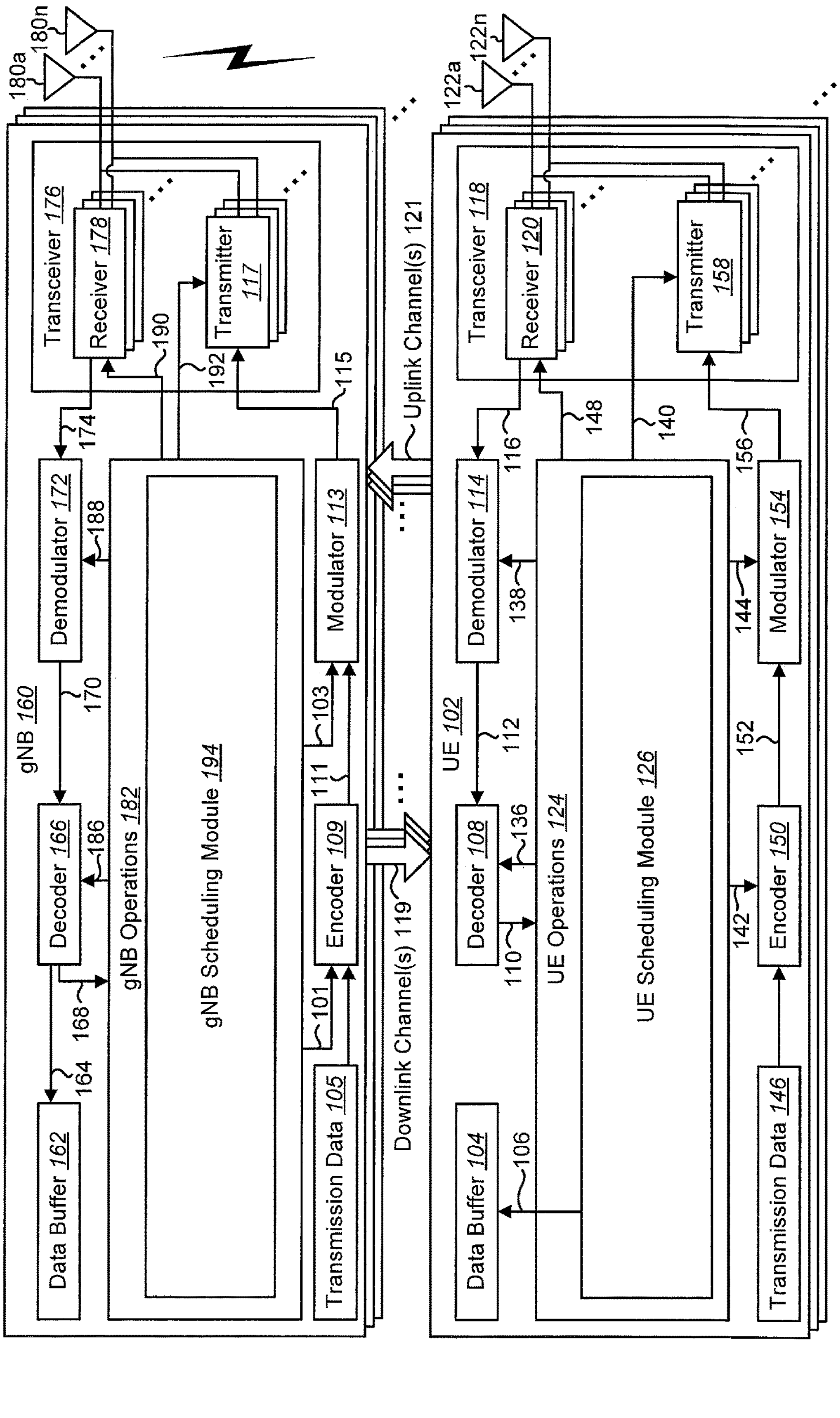
FIG. 1 is a block diagram illustrating one implementation of one or more gNBs and one or more UEs in which systems and methods for collision resolution may be implemented.

A user equipment (UE) is described. The UE includes circuitry configured to determine that a physical uplink shared channel (PUSCH) with high priority (HP) overlaps with multiple HP physical uplink control channels (PUCCHs) carrying HP hybrid automatic repeat request-acknowledgements (HARQ-ACKs). The circuitry is also configured to concatenate the HP HARQ-ACKs of the overlapping HP PUCCHs into a joint HARQ-ACK codebook. The circuitry is additionally configured to multiplex the concatenated HP HARQ-ACKs on the HP PUSCH.

A base station (gNB) is also described. The gNB includes receiving circuitry configured to determine that a physical uplink shared channel (PUSCH) with high priority (HP)

overlaps with multiple HP physical uplink control channels (PUCCHs) carrying HP hybrid automatic repeat request-acknowledgements (HARQ-ACKs). The receiving circuitry is also configured to receive the HP PUSCH. The HP PUSCH includes the HP HARQ-ACKs of the overlapping PUCCHs concatenated into a joint HARQ-ACK codebook.

Another UE is described. The UE includes circuitry configured to determine that a physical uplink shared channel (PUSCH) with high priority (HP) overlaps with multiple HP physical uplink control channels (PUCCHs) carrying HP hybrid automatic repeat request-acknowledgements (HARQ-ACKs). The circuitry is also configured to separately code the HP HARQ-ACKs of the overlapping HP PUCCHs. The circuitry is additionally configured to separately calculate a number of resource elements (REs) for HARQ-ACK rate matching. The circuitry is further configured to jointly map coded bits for each HARQ-ACK to the REs of the HP PUSCH.

Another gNB is described. The gNB includes receiving circuitry configured to determine that a physical uplink shared channel (PUSCH) with high priority (HP) overlaps with multiple HP physical uplink control channels (PUCCHs) carrying HP hybrid automatic repeat request-acknowledgements (HARQ-ACKs). The receiving circuitry is also configured to receive the HP PUSCH. The HP PUSCH includes separately coded HP HARQ-ACKs of the overlapping HP PUCCHs.

Another UE is described. The UE includes circuitry configured to determine that a physical uplink shared channel (PUSCH) with high priority (HP) overlaps with multiple HP physical uplink control channels (PUCCHs) carrying HP hybrid automatic repeat request-acknowledgements (HARQ-ACKs). The circuitry is also configured to independently multiplex the HP HARQ-ACKs of the overlapping HP PUCCHs on the HP PUSCH. Multiplexing symbols for the HP HARQ-ACK of an overlapping HP PUCCH are confined such that no overlap occurs between the multiplexed HP HARQ-ACKs from different HP PUCCHs.

Another gNB is described. The gNB includes receiving circuitry configured to determine that a physical uplink shared channel (PUSCH) with high priority (HP) overlaps with multiple HP physical uplink control channels (PUCCHs) carrying HP hybrid automatic repeat request-acknowledgements (HARQ-ACKs). The receiving circuitry is also configured to receive the HP PUSCH. Multiplexing symbols for HP HARQ-ACK of an overlapping HP PUCCH are confined such that no overlap occurs between the multiplexed HP HARQ-ACKs from different HP PUCCHs.

Another UE is described. The UE includes circuitry configured to determine that a physical uplink shared channel (PUSCH) with high priority (HP) overlaps with multiple HP physical uplink control channels (PUCCHs) carrying HP hybrid automatic repeat request-acknowledgements (HARQ-ACKs). The circuitry is also configured to drop the HP PUSCH. The circuitry is further configured to transmit the overlapping HP PUCCHs.

Another gNB is described. The gNB includes receiving circuitry configured to determine that a physical uplink shared channel (PUSCH) with high priority (HP) overlaps with multiple HP physical uplink control channels (PUCCHs) carrying HP hybrid automatic repeat request-acknowledgements (HARQ-ACKs). The receiving circuitry is also configured to receive the overlapping HP PUCCHs. The PUSCH is dropped.

Another UE is described. The UE includes receiving circuitry configured to receive scheduling information indicating a high priority (HP) physical uplink shared channel (PUSCH) and HP hybrid automatic repeat request-acknowledgement (HARQ-ACK) feedback on a HP physical uplink control channel (PUCCH). The HP PUSCH is not expected to overlap with more than one HP PUCCH carrying HP HARQ-ACK.

Another gNB is described. The gNB includes circuitry configured to schedule a high priority (HP) physical uplink shared channel (PUSCH) and HP hybrid automatic repeat request-acknowledgement (HARQ-ACK) feedback on a HP physical uplink control channel (PUCCH) to avoid overlap between the HP PUSCH and more than one HP PUCCH carrying HP HARQ-ACK.

The 3rd Generation Partnership Project, also referred to as "3GPP," is a collaboration agreement that aims to define globally applicable technical specifications and technical reports for third, fourth, and fifth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and/or other standards (e.g., 3GPP Releases 8, 9, 10, 11, 12, 13, 14, 15, 16, 17, etc.). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In de-scribing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (CNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote a wireless communication device and/or a base station. An eNB and/or gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink (DL) resources and the carrier frequency of the uplink (UL) resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells for which the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station or base station device.

In some approaches, uplink control information (UCI) multiplexing on PUSCH may be supported only for UCI and a PUSCH with the same priority. If there is an overlap between a PUCCH and PUSCH with different priorities, the high priority (HP) channel may be transmitted, and the low priority (LP) channel may be dropped.

In some approaches, HARQ-ACK multiplexing on PUSCH of a different priority may be supported. In some examples, a PUCCH may be configured with a subslot structure, while no subslot may be configured for PUSCH. The PUSCH allocation may be flexible in a slot with different starting symbols and durations. Accordingly, multiple HP PUCCHs for HP HARQ-ACK may overlap with a HP PUSCH or a LP PUSCH in some scenarios.

There is a need to establish approaches for single HP HARQ-ACK multiplexing and/or for handling multiple HP HARQ-ACK overlap with a PUSCH. In some approaches for collision resolution, a UE may handle channels with the same priority first. Some examples of the techniques described herein illustrate cases of overlapping between multiple HP PUCCHs for HP HARQ-ACK with a HP PUSCH.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for collision resolution may be implemented. The one or more UEs 102 communicate with one or more gNBs 160 using one or more antennas 122*a-n*. For example, a UE 102 transmits electromagnetic signals to the gNB 160 and receives electromagnetic signals from the gNB 160 using the one or more antennas 122*a-n*. The gNB 160 communicates with the UE 102 using one or more antennas 180*a-n*.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

In some examples, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-Acknowledgement (HARQ-ACK), Channel State Information (CSI), and/or Scheduling Request (SR) signals. The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. For example, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104, and a UE operations module 124. For example, one or more reception and/or transmission paths may be implemented in the UE 102. For convenience, only a single transceiver 118, decoder 108, demodulator 114, encoder 150, and modulator 154 are illustrated in the UE 102, though multiple parallel elements (e.g., transceivers 118, decoders 108, demodulators 114, encoders 150, and modulators 154) may be implemented. In some examples, one or more of the components (e.g., the UE operations module 124) of the UE 102 may be implemented in hardware, a combination of hardware and instructions, one or more circuitries, and/or one or more processors. For instance, one or more of the components of the UE 102 may be included in one or more circuitries, one or more modems, one or more RF front ends, and/or one or more processors, etc.

The transceiver 118 may include one or more receivers 120 and one or more transmitters 158. The one or more receivers 120 may receive signals from the gNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126. In some examples, the UE scheduling module 126 may be utilized to perform collision resolution and/or collision avoidance as described herein. For instance, the UE 102, the UE operations module 124, and/or the UE scheduling module 126 may perform one or more of the operations, functions, approaches, and/or examples described herein.

Some examples of the techniques described herein may provide approaches for collision resolution between multiple high priority HARQ-ACKs and a high priority PUSCH. A high priority UCI may be a high priority HARQ-ACK or a high priority SR. A high priority HARQ-ACK corresponds to a high priority PDSCH transmission. A PDSCH may be dynamically scheduled by downlink control information (DCI) or configured by semi-persistent scheduling (SPS). The priority of a scheduled PDSCH transmission may be determined by the priority indication in the scheduling DCI. The priority of a SPS PDSCH transmission may be configured by higher layer signaling. A high priority PUCCH resource may be used to report high priority HARQ-ACK with or without SR. A high priority PDSCH, high priority HARQ-ACK, or high priority PUCCH resource may be configured to support URLLC services. The high priority may be configured with a priority index 1. Thus, a high priority PDSCH/PUSCH may be a PDSCH/PUSCH with priority index 1, a high priority HARQ-ACK may be a HARQ-ACK with priority index 1 corresponding to a PDSCH with priority index 1. A PUCCH resource with priority index 1 may be used to report UCI with priority index 1.

A low priority UCI may be a low priority HARQ-ACK or a low priority SR, or a CSI report, etc. A low priority HARQ-ACK corresponds to a low priority PDSCH transmission. The priority of a scheduled PDSCH transmission may be determined by the priority indication in the scheduling DCI. The priority of a SPS PDSCH transmission may be configured by higher layer signaling. A low priority PUCCH resource may be used to report low priority UCI. A low priority PDSCH, low priority HARQ-ACK, or low priority PUCCH resource may be configured to support eMBB services. The low priority may be configured with a priority index 0. Thus, a low priority PDSCH/PUSCH may be a PDSCH/PUSCH with priority index 0. A low priority HARQ-ACK may be a HARQ-ACK with priority index 0 corresponding to a PDSCH with priority index 0. A PUCCH resource with priority index 0 may be used to report UCI with priority index 0. As used herein, the term "low priority" may mean a priority that is lower than "high priority." For instance, "high priority" information may take precedence over "low priority" information, or a "high priority" channel may take precedence over a "low priority" channel.

For HARQ-ACK priorities, if a UE 102 is provided a pdsch-HARQ-ACK-Codebook-List, the UE 102 can be indicated by the pdsch-HARQ-ACK-Codebook-List to generate one or two HARQ-ACK codebooks. If the UE 102 is indicated to generate two HARQ-ACK codebooks, a first HARQ-ACK codebook may be associated with a PUCCH of priority index 0 and a second HARQ-ACK codebook may be associated with a PUCCH of priority index 1.

For SR priorities, a UE 102 may be configured, by SchedulingRequestResourceConfig, a set of configurations for SR in a PUCCH transmission using either PUCCH format 0 or PUCCH format 1. A UE 102 may be configured, by schedulingRequestIDForBFR, a configuration for a link recovery request (LRR) in a PUCCH transmission using either PUCCH format 0 or PUCCH format 1. The UE 102 can be configured, by schedulingRequestPriority in SchedulingRequestResourceConfig, a priority index 0 or a priority index 1 for the SR.

A PUSCH or a PUCCH, including repetitions if any, may be of priority index 0 or of priority index 1. If a priority index is not provided for a PUSCH. or a PUCCH, the priority index may be 0. If in an active DL BWP a UE 102 monitors PDCCH either for detection of DCI format 0_1 and DCI format 1_1 or for detection of DCI format 0_2 and DCI format 1_2, a priority index may be provided by a priority indicator field. If a UE 102 indicates a capability to monitor, in an active DL BWP, PDCCH for detection of DCI format 0_1 and DCI format 1_1 and for detection of DCI format 0_2 and DCI format 1_2, a DCI format 0_1 or a DCI format 0_2 may schedule a PUSCH transmission of any priority and a DCI format 1_1 or a DCI format 1_2 may schedule a PDSCH reception and trigger a PUCCH transmission with corresponding HARQ-ACK information of any priority. If, after resolving overlapping for PUCCH and/or PUSCH transmissions of a same priority index, a UE 102 determines to transmit:

- a first PUCCH of larger priority index, a PUSCH or a second PUCCH of smaller priority index, and a transmission of the first PUCCH would overlap in time with a transmission of the PUSCH or the second PUCCH, the UE 102 may not transmit the PUSCH or the second PUCCH;

a PUSCH of larger priority index, a PUCCH of smaller priority index, and a transmission of the PUSCH would overlap in time with a transmission of the PUCCH, the UE 102 may not transmit the PUCCH; or a first PUSCH of larger priority index on a serving cell, a second PUSCH of smaller priority index on the serving cell, and a transmission of the first PUSCH would overlap in time with a transmission of the second PUSCH, the UE 102 may not transmit the second PUSCH, where at least one of the two PUSCH is not scheduled by a DCI format.

In some approaches (e.g., NR Rel-16), a UE 102 may only multiplex UCIs with a same priority index in a PUCCH or a PUSCH. A PUCCH or a PUSCH may be assumed to have a same priority index as a priority index of UCIs a UE 102 multiplexes in the PUCCH or the PUSCH. For intra-UE collision between uplink channels with different priorities, the uplink channel with high priority may be transmitted, and the low priority channel may be dropped.

If a UE 102 is provided two PUCCH-Config:

if the UE 102 is provided subslotLengthForPUCCH-r16 in the first PUCCH-Config, the PUCCH resource for any SR configuration with priority index 0 or any CSI report configuration in any PUCCH-Config may be within the subslotLengthForPUCCH-r16 symbols in the first PUCCH-Config; or if the UE 102 is provided subslotLengthForPUCCH-r16 in the second PUCCH-Config, the PUCCH resource for any SR configuration with priority index 1 in any PUCCH-Config may be within the subslotLengthForPUCCH-r16 symbols in the second PUCCH-Config.

In some examples, if a UE 102 is not provided subslot-Length-ForPUCCH, a slot for an associated PUCCH transmission may include all symbols in a slot, 14 symbols with normal cyclic prefix, or 12 symbols with extended cyclic prefix. In some examples, if a UE 102 is provided subslot-Length-ForPUCCH, a slot for an associated PUCCH transmission may include a number of symbols indicated by subslotLength-ForPUCCH.

In some approaches, UCI multiplexing on PUSCH may be performed in accordance with the following. If a PUCCH carrying a UCI overlaps with a PUSCH, the UCI may be multiplexed on PUSCH if simultaneous PUCCH and PUSCH is not configured or supported. In some examples, if simultaneous PUCCH and PUSCH is not supported on the same carrier, UCI multiplexing on PUSCH may be performed when the PUCCH and PUSCH are on the same carrier. In some examples, only HARQ-ACK and CSI may be multiplexed on PUSCH, and SR may not be multiplexed on PUSCH in some approaches.

When UCI is multiplexed on a PUSCH, the overlapping condition of the PUCCH for a UCI type may be evaluated separately with the PUSCH, and the UCI multiplexing of different UCI types may be multiplexed on PUSCH based on the UCI types, for example, the HARQ-ACK may be multiplexed first based on the number of HARQ-ACK bits, followed by CSI which is rate matched after the HARQ-ACK multiplexing.

Offset values may be defined for a UE 102 to determine a number of resources for multiplexing HARQ-ACK information and for multiplexing CSI reports in a PUSCH. Offset values may also be defined for multiplexing configured grant UCI (CG-UCI) in a configured grant PUSCH (CG-PUSCH). The offset values may be signaled to a UE 102 either by a DCI format scheduling the PUSCH transmission or by higher layers.

In some approaches (e.g., Rel-15), only one service type (e.g., eMBB) may be supported, and simultaneous PUCCH and PUSCH may not be supported. Some timeline restrictions are specified in Rel-15 for UCI multiplexing on PUSCH. For instance, a UE may not be expected to receive a PUCCH and an overlapping PUSCH that does not satisfy the timeline requirements. In some approaches, UCI multiplexing may be always performed in case of overlap between a PUCCH and a PUSCH.

In some approaches (e.g., Rel-16), different service types (e.g., eMBB and URLLC) may be supported. For a PUSCH with a given priority index, only the UCI with the same priority carried on a PUCCH with the same priority may be multiplexed on the PUSCH in some approaches.

In a case of overlap between channels with different priorities, a channel dropping rule may be defined so that the high priority channel is transmitted, and the low priority channel is dropped in some approaches. Dropping timelines may be defined for different types of UL channels and UCI types.

In some approaches (e.g., NR Rel-17), UCI of different priorities may be multiplexed on a single PUCCH or PUSCH. Furthermore, a UCI with a given priority may be multiplexed on a PUSCH with different priorities. To differentiate the priority of a UCI, different offset values or sets of offset values may be configured for different combinations between the HARQ-ACK priority and PUSCH priority. For instance, using HARQ-ACK as an example, the following UCI multiplexing scenarios may be supported:

HP HARQ-ACK on HP PUSCH

LP HARQ-ACK on LP PUSCH.

HP HARQ-ACK on LP PUSCH

LP HARQ-ACK on HP PUSCH

In some examples, HARQ-ACK of different priorities may be reported on a single PUSCH, including:

HP HARQ-ACK and LP HARQ-ACK on LP PUSCH.

HP HARQ-ACK and LP HARQ-ACK on HP PUSCH

CSI may be treated as low priority (in Rel-16, for instance). In some approaches, if CSI is present on a LP PUSCH, the HP UCI may also be multiplexed on a LP PUSCH, including:

HP HARQ-ACK and CSI on LP PUSCH.

HP HARQ-ACK, LP HARQ-ACK and CSI on LP PUSCH

The CSI may be a periodic CSI, a semi-persistent CSI, or an aperiodic CSI. When multiplexed together with HP UCI on PUSCH, the low priority CSI may be limited to CSI part 1 only.

In some approaches (e.g., Rel-17), CSI enhancements may be considered, and some new CSI reports may be supported for URLLC or the high priority service. The new CSI reports may be treated as high priority, or indicated as high priority (i.e., priority index 1). The HP CSI may be reported together with HP HARQ-ACK on a PUCCH or PUSCH.

Figures 8A, 8B:
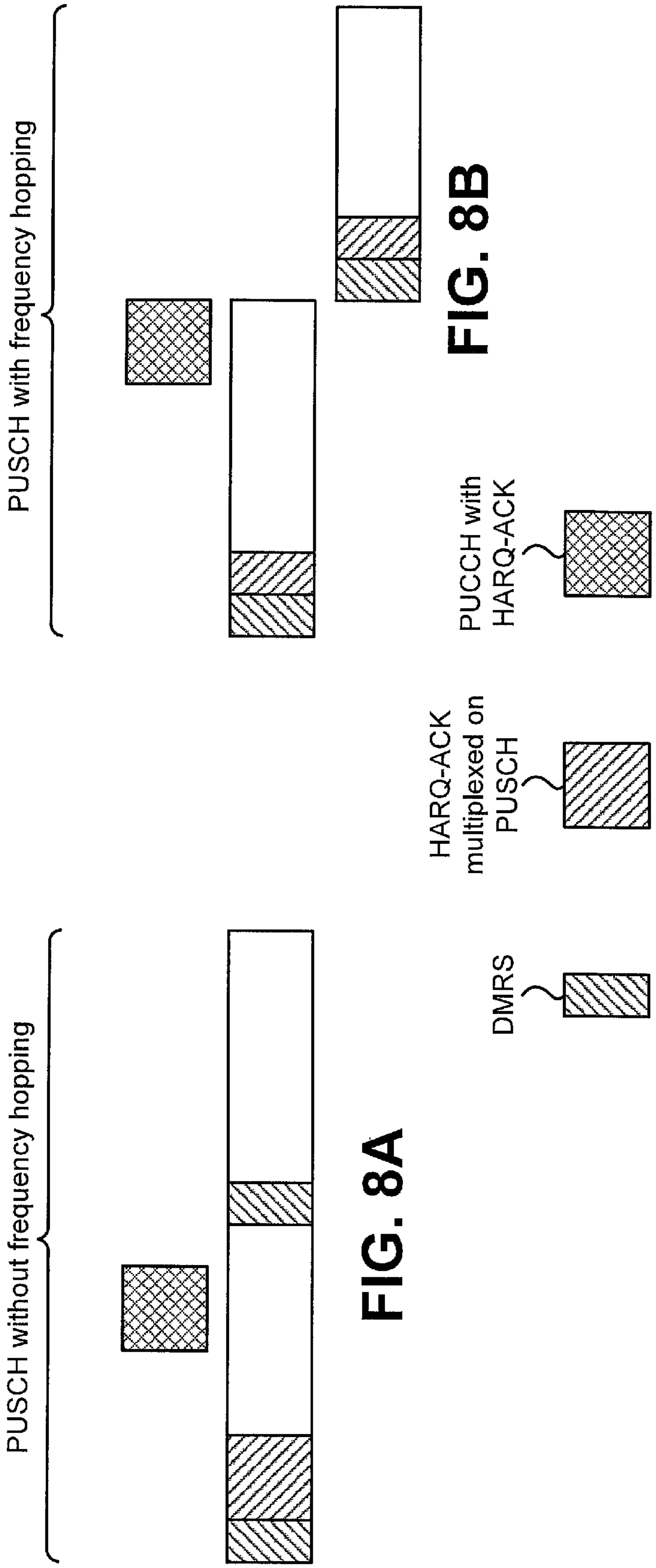
FIG. 8A is a diagram illustrating an example of HARQ-ACK multiplexing on a PUSCH without frequency hopping.
FIG. 8B is a diagram illustrating an example of HARQ-ACK multiplexing on a PUSCH with frequency hopping

HP HARQ-ACK multiplexing on PUSCH may present potential problems. Some examples of the techniques described herein provide approaches for HARQ-ACK multiplexing on PUSCH. In some approaches, for HARQ-ACK multiplexing on PUSCH of the same priority, multiplexing procedures and locations may be determined based on a HARQ-ACK payload and frequency hopping configurations, as shown in FIGS. 8A-8B.

If the number of HARQ-ACK (e.g., HARQ-ACK bit(s)) is up to 2 bits, a set of reserved locations and resource element (RE) resources may be used. The number of reserved HARQ-ACK locations and RE resources may be achieved by calculating the rate-matching length of the HARQ-ACK with the number of HARQ-ACK bits set to 2. The HARQ-ACK may be mapped to the REs in an OFDM symbol that is available after the first consecutive DM-RS OFDM symbols.

If the number of HARQ-ACK (e.g., HARQ-ACK bit(s)) is more than 2 bits, the coded HARQ-ACK bits may be mapped starting at REs starting from the OFDM symbol that is available after the first consecutive DM-RS OFDM symbols.

If frequency hopping is configured, the HARQ-ACK may be multiplexed on both hops (e.g., the HARQ-ACK multiplexed REs may be distributed in two hops).

If a UE 102 is provided two PUCCH-Config, HP PUCCH resources (e.g., PUCCH resources with priority 1) may be configured to report the HP HARQ-ACK (e.g., HARQ-ACK with priority index 1). LP PUCCH resources (e.g., PUCCH resources with priority 0) may be configured to report the LP HARQ-ACK (e.g., HARQ-ACK with priority index 0).

In some examples, the PUCCH resources may be configured with slot(s) or subslot(s). In an example, the HP PUCCH resources may be configured with subslot(s) (e.g., a subslot structure), and the LP PUCCH resources may be configured with slot(s) (e.g., a slot structure). The subslot duration may be 2 or 7 symbols. In another example, the HP PUCCH resources may be configured with subslot(s) (e.g., a subslot structure), and the LP PUCCH may be configured with subslot(s) (e.g., a subslot structure). In this case, the subslot duration configured for the HP PUCCH may be shorter than or the same as the subslot duration for the LP PUCCH. In some examples, there may be no subslot configuration for a PUSCH. Thus, a PUSCH may be scheduled with any number of symbols in a slot in some approaches.

If the HP PUCCH is configured with subslot(s) (e.g., a subslot structure), HP HARQ-ACK may be reported in each subslot. Accordingly, a HP PUSCH or a LP PUSCH may overlap with multiple HP PUCCH carrying HP HARQ-ACK.

Figure 9:
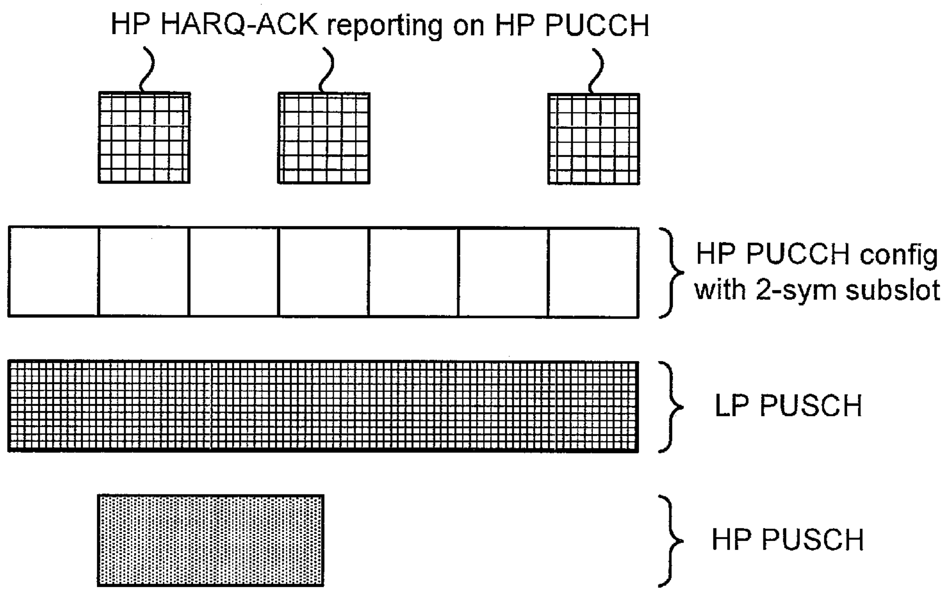
FIG. 9 is a diagram illustrating an example of multiple HP PUCCHs for HP HARQ-ACK overlapping with a LP PUSCH and/or a HP PUSCH.

In an example shown in FIG. 9, the HP PUCCH is configured with a subslot duration of 2 symbols. Accordingly, there are potentially 7 PUCCH transmissions for HARQ-ACK reporting. In the example shown in FIG. 9, there are three instances of HP HARQ-ACK reporting on the HP PUCCH corresponding to HP PDSCH transmissions. In some approaches, all HP PUCCHs overlap with the LP PUSCH, which occupies all symbols in the slot. Similarly, in this example, a HP PUSCH also overlaps with two HP PUCCHs carrying HARQ-ACK. If a 7-symbol subslot is configured, each subslot may have a HP PUCCH for HP HARQ-ACK reporting. Thus, a slot may potentially have 2 HP PUCCH transmissions.

In some approaches, only one HARQ-ACK codebook of each priority is considered for multiplexing on a PUSCH. If there are multiple HP PUCCHs carrying HP HARQ-ACKs overlapping with a PUSCH, directly using these approaches may cause several potential problems. For instance, the multiple HP HARQ-ACK may be multiplexed on the same REs or symbols following the HP HARQ-ACK multiplexing procedures on PUSCH. The timing relationship between the HP PDSCH and the HP HARQ-ACK may be changed. Accordingly, it may be beneficial to provide approaches to deal with multiple HP PUCCHs with HP HARQ-ACK overlapping with a PUSCH.

Multiple HP PUCCHs with HP HARQ-ACK may occur in many different scenarios between PUCCHs and PUSCHs with different types, for example:

A HP PUCCH may be scheduled by one or more DCIs with the HARQ-ACK timing indication.

A HP PUCCH may be configured for SPS transmission with high priority.

A HP PUCCH may be a deferred retransmission of an earlier HP PUCCH for SPS that conflicts with a SFI configuration.

A HP PUSCH may be dynamically scheduled by a DCI with timing indication.

A HP PUSCH may be a transmission from a configured grant.

In some examples, the UE 102 (e.g., UE operations module 124 and/or UE scheduling module 126) and/or the gNB 160 (e.g., gNB operations module 182 and/or gNB scheduling module 194) may determine that a PUSCH with HP overlaps with multiple HP PUCCHs carrying HP HARQ-ACKs (e.g., one or more HP HARQ-ACKs per HP PUCCH). For instance, the gNB 160 (e.g., gNB scheduling module 194) may schedule a HP PUSCH and/or may schedule multiple HP PUCCHs carrying HP HARQ-ACKs, where the HP PUCCHs overlap in time (e.g., slot(s) and/or subslot(s)) with the HP PUSCH. In some examples, the UE 102 may receive one or more scheduling in-dications that may schedule a HP PUSCH and/or may schedule multiple HP PUCCHs carrying HP HARQ-ACKs, where the HP PUCCHs overlap in time (e.g., slot(s) and/or subslot(s)) with the HP PUSCH.

Some of the techniques described herein may provide approaches for collision handling between multiple HP HARQ-ACKs and a HP PUSCH. To handle overlapping PUCCHs/PUSCHs with different priorities, the following steps may be performed in some approaches:

Step 1: Resolve overlapping PUCCHs and/or PUSCHs with the same priority

Step 2: Resolve overlapping PUCCHs and/or PUSCHs with different priorities

In some examples, recursive pseudo-code may be avoided to implement this procedure. In some examples, a Rel-15 intra-UE UCI multiplexing timeline may be applicable.

Some examples of the techniques described herein may address the first step: resolving overlapping PUCCHs and/or PUSCHs with the same priority. After the first step of channel resolution for HP channels, there may be only one HP channel left in each subslot in some examples.

For services with low priority (e.g., eMBB), there may be only one PUCCH transmission for LP HARQ-ACK in a slot. For services with high priority (e.g., URLLC), if a subslot structure is configured for the HP PUCCHs resources for HP HARQ-ACK, only one HARQ-ACK PUCCH may be reported in each subslot, and the PUCCH resources for HARQ-ACK may be confined within a subslot. Thus, there may be no overlap between the HP PUCCHs carrying HP HARQ-ACK, but more than one HP PUCCH transmission carrying HP HARQ-ACK in a slot may be possible.

In some approaches (e.g., Rel-15), if there is a PUCCH for HARQ-ACK overlaps with a PUSCH, a UE may expect the UCI multiplexing on PUSCH to be performed assuming the multiplexing timeline is always satisfied. In these approaches, it is an error case if the multiplexing timeline is not satisfied, and no UE behavior is defined.

As noted above, the Rel-15 intra-UE UCI multiplexing timeline may be applicable for collision resolution in Rel-17. Assuming the timeline conditions can be met for all overlapping HP PUCCHs, several approaches are provided herein to handle overlap between a HP PUSCH with multiple HP PUCCHs carrying HP HARQ-ACKs. In some examples, an "approach" described herein may be a method or an example of a method.

Approach 1: Joint coding and RE mapping of HP HARQ-ACK from all overlapping HP PUCCHs. In some approaches, joint coding of the same UCI type with the same priority is not supported on either PUCCH or PUSCH. In some approaches, the following may be supported cases:

On PUCCH:

- Different UCI types with the same priority may be multiplexed (e.g., HARQ-ACK and SR, HARQ-ACK and CSI).
- Same UCI type with different priorities may be multiplexed (e.g., HARQ-ACK with different priorities). Joint coding may be applied only when the total HARQ-ACK payload from different priorities is 2 bits, and separate coding may be applied if the total payload is more than 2 bits.
- Different UCI types with different priorities may be multiplexed (e.g., LP HARQ-ACK with HP SR).

On PUSCH:

- Different UCI types with the same priority may be multiplexed (e.g., HARQ-ACK and CSI).
- Same UCI type with different priorities may be multiplexed (e.g., HARQ-ACK with different priorities). Separate coding may be applied for HARQ-ACK codebooks with different priorities.

In approach 1, joint coding of the same UCI type with the same priority may be utilized. HP HARQ-ACKs carried in the multiple HP PUCCHs may be concatenated together into a joint HARQ-ACK codebook. The concatenated HARQ-ACK bits may then be multiplexed on the HP PUSCH.

The concatenation may be performed based on the subslot ordering of the multiple HP PUCCH. The HARQ-ACK bits carried in the first overlapping HP PUCCH may be put first, followed by the HARQ-ACK bits carried in a later overlapping HP PUCCH in a later subslot, until all HARQ-ACK bits are included in the concatenated HARQ-ACK or the joint HARQ-ACK codebook. The concatenated or joint HARQ-ACK may then be multiplexed on the HP PUSCH following multiplexing rules including the code rate determination and RE mapping, etc., using the joint HP HARQ-ACK codebook as the single HP HARQ-ACK.

With joint coding, the HARQ-ACK reporting may be more efficient with a single coding chain. In a case of two overlapping HP PUCCHs each carrying 1-bit of HARQ-ACK, the joint HARQ-ACK may be only 2 bits and may be multiplexed on the reserved RE resources for up to 2 bits of HARQ-ACK. Some benefits of approach 1 may include that one (e.g., only one) HARQ-ACK multiplexing procedure is performed and/or may include increased efficiency with joint coding.

Approach 2: Separate coding with joint RE mapping of HP HARQ-ACK from all overlapping HP PUCCHs. In approach 2, the HP HARQ-ACK in each overlapping HP PUCCH may be coded separately and/or the number of REs for the HARQ-ACK rate matching output may be calculated separately. The coded bits after rate matching for each HARQ-ACK may then be jointly mapped to the RE resources following the PUCCH ordering. The HARQ-ACK bits carried in the first overlapping HP PUCCH may be multiplexed first with the calculated number of REs, followed by the coded and rate matched HARQ-ACK bits for a later overlapping HP PUCCH in a later subslot, until all coded and rate matched HARQ-ACK bits are multiplexed on the HP PUSCH.

In this approach, since each HARQ-ACK codebook from each overlapping PUCCH is coded separately, and more than one coded HARQ-ACK outputs are multiplexed on the HP PUSCH, the RE mapping may use the approach of more than 2 bits of single HARQ-ACK payload. Thus, even if there is 1 or if there are 2 bits of HARQ-ACK in a codebook from an overlapping HP PUCCH, the reserved RE resources for up to 2 bits of HARQ-ACK may not be used.

If frequency hopping is configured, the RE mapping may be divided into two parts in two hops. The number of REs in each hop may be calculated for the coded output of each HARQ-ACK codebook separately using the current RE mapping rules for a single HARQ-ACK. Thus, the coded HARQ-ACK bits for each HARQ-ACK codebook are evenly distributed in each hop.

Some benefits of approach 2 may include maintaining the coding and rate matching for each HARQ-ACK codebook and/or avoiding overwriting of multiplexed HARQ-ACK by later HARQ-ACK.

Approach 3: the HP HARQ-ACK of each overlapping PUCCH is multiplexed on the HP PUSCH independently on the PUSCH. With approach 1 or approach 2 above, the HP HARQ-ACK bits from different overlapping HP PUCCHs are jointly mapped to the HP PUSCH. Thus, the HARQ-ACK timeline of one or more PUCCHs may be broken.

To maintain the HARQ-ACK timeline of each overlapping HP PUCCH, in case of a HP PUSCH overlapping with more than one HP PUCCH carrying HP HARQ-ACK, a different UCI multiplexing approach may be used from the single HP HARQ-ACK codebook case. With the new HARQ-ACK multiplexing approach, the multiplexing symbols for the HP HARQ-ACK of an overlapping HP PUCCH may be confined so that no overlap may occur between the multiplexed HP HARQ-ACK bits from different HP PUCCHs.

One or more techniques may be utilized to limit the location of the HARQ-ACK multiplexing symbols. In one technique, the multiplexing symbols on the HP PUSCH for the HARQ-ACK of an overlapping PUCCH may be confined within the overlapping symbols between the corresponding HP PUCCH and the HP PUSCH. In another technique, the multiplexing symbols on the HP PUSCH for the HARQ-ACK of an overlapping PUCCH may be confined within the subslot carrying the corresponding HP PUCCH. Some benefits of approach 3 may include that the HP HARQ-ACK timeline is the same as the corresponding HP PUCCH.

Approach 4: Drop the HP PUSCH, and transmit all overlapping HP PUCCH. In approach 4, if a HP PUSCH overlaps with more than one HP PUCCH carrying HP HARQ-ACK, the HP PUSCH may be dropped, and all HP PUCCHs with HP HARQ-ACKs may be transmitted. The HP PUSCH may be dropped from (e.g., at least from) an overlapping symbol with the first overlapping PUCCH with the PUSCH. Once dropped, the PUSCH transmission may not be resumed after the overlapping region. Some benefits of approach 4 may include simplicity, where UCI multiplexing may not be performed on the PUSCH.

Approach 5: Provide some restrictions and/or unexpected conditions on scheduling to avoid the case. In approach 5, a HP PUSCH overlapping with more than one HP PUCCH carrying HP HARQ-ACK may not be supported. The case can be viewed as an error case or an exception case. For example, the UE 102 may not be expected to have a HP PUSCH overlapping with more than one HP PUCCH carrying HARQ-ACK. The gNB 160 may schedule the HP PUSCH and HP HARQ-ACK feedback on HP PUCCH such that the case will not occur. For instance, the gNB 160 may schedule an HP PUSCH and HP HARQ-ACK feedback to avoid the case of a HP PUSCH overlapping with more than one HP PUCCH carrying HP HARQ-ACK.

In some examples, in a case of multiple HP HARQ-ACK feedback, the gNB 160 may adjust the HARQ-ACK timing kl indication in the DCI and direct them in a single PUCCH report. Alternatively, the gNB 160 may adjust the HARQ-ACK feedback timing kl for the HP PUCCHs so that only one HP PUCCH for HARQ-ACK will overlap with a HP PUSCH.

In some examples, for a HP PUSCH transmission, the gNB 160 may schedule different resource allocation to deliver the data (e.g., using a shorter duration with less symbols but with more PRB allocation in the frequency domain). Alternatively, the gNB 160 may adjust the location of a HP PUSCH so that it will not overlap with more than one HP PUCCH with HP HARQ-ACK.

As described above, multiple HP PUCCH with HP HARQ-ACK overlapping case may happen in many different scenarios. Using approach 5 may provide further restrictions on gNB 160 scheduling flexibility to avoid all the potential scenarios. For example, a SPS PUCCH and a CG PUSCH that are using pre-configured resources may not be changed dynamically. A postponed PUCCH for SPS HARQ-ACK reporting may use the next available resource, and may not be scheduled as a regular PUCCH.

In some examples of the techniques described herein, a UE (e.g., UE 102) may transmit or may not transmit information (e.g., PUSCH, PUCCH, UCI, SR, and/or HARQ-ACK, etc.). In some examples, a base station (e.g., gNB 160) correspondingly may receive or may not receive the information (e.g., PUSCH, PUCCH, UCI, SR, and/or HARQ-ACK, etc.) described in relation to a UE herein. In some examples, the UE 102 (e.g., UE operations module 124 and/or UE scheduling module 126) may perform one or more of the operations described in relation to one or more of the Figures described herein. In some examples, the gNB 160 (e.g., gNB operations module 182 and/or gNB scheduling module 194) may perform one or more of the operations described in relation to one or more of the Figures described herein.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162, and a gNB operations module 182. For example, one or more reception and/or transmission paths may be implemented in a gNB 160. For convenience, only a single transceiver 176, decoder 166, demodulator 172, encoder 109, and modulator 113 are illustrated in the gNB 160, though multiple parallel elements (e.g., transceivers 176, decoders 166, demodulators 172, encoders 109, and modulators 113) may be implemented. In some examples, one or more of the components (e.g., the gNB operations module 182) of the gNB 160 may be implemented in hardware, a combination of hardware and instructions, one or more circuitries, and/or one or more processors. For instance, one or more of the components of the gNB 160 may be included in one or more circuitries, one or more modems, one or more RF front ends, and/or one or more processors, etc.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations as described herein. In some examples, the gNB scheduling module 194 may be utilized to configure collision resolution procedures and/or to receive communications from a UE in accordance with the procedures described herein. For instance, the gNB 160, the gNB operations module 182, and/or the gNB scheduling module

194 may receive transmissions from the UE in accordance with one or more of the methods, operations, functions, approaches, and/or examples described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
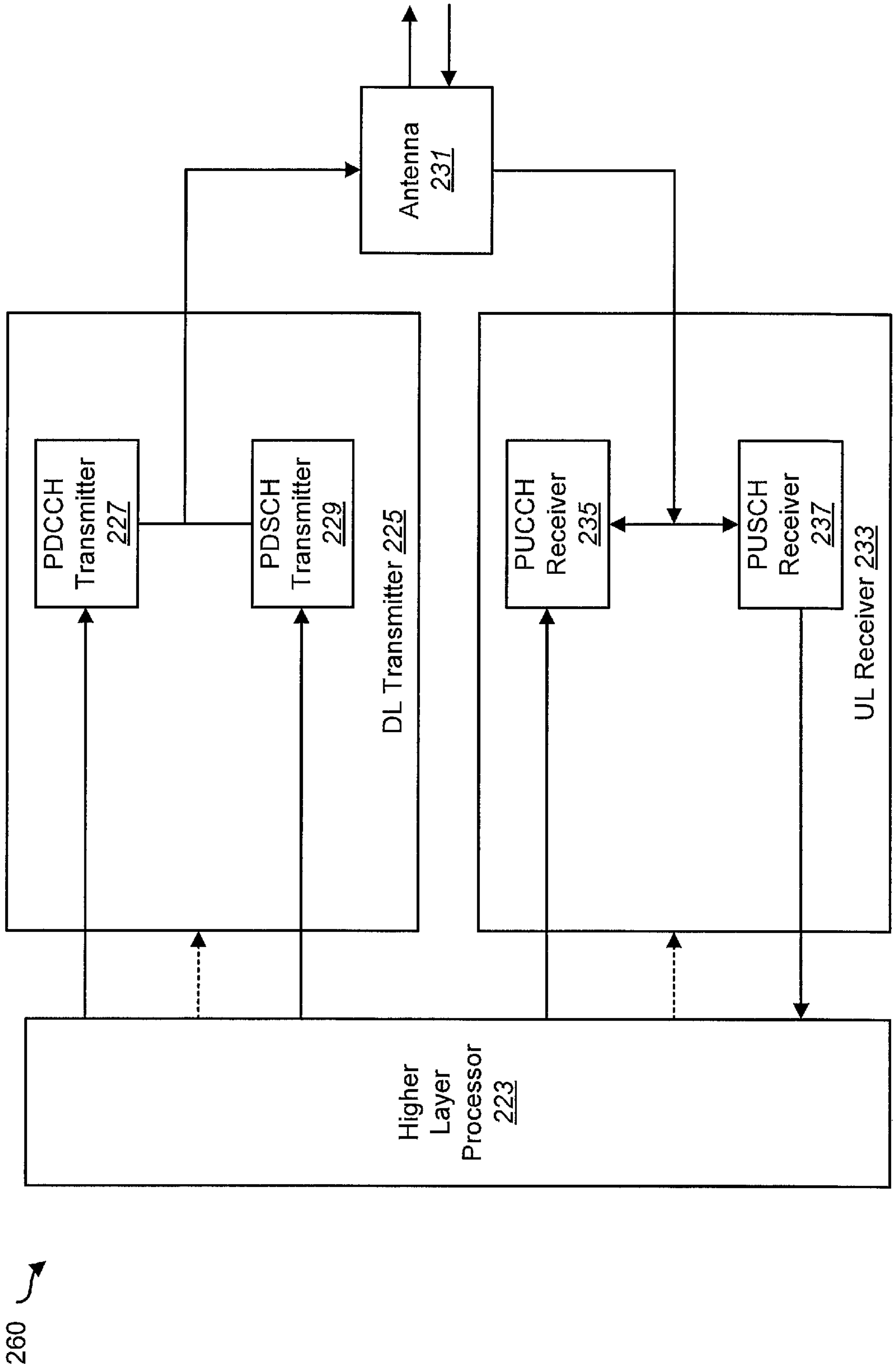
FIG. 2 is a block diagram illustrating one implementation of a gNB.

FIG. 2 is a block diagram illustrating one implementation of a gNB 260. The gNB 260 may be implemented in accordance with the gNB 160 described in connection with FIG. 1 in some examples, and/or may perform one or more of the functions described herein. The gNB 260 may include a higher layer processor 223, a DL transmitter 225, a UL receiver 233, and one or more antenna 231. The DL transmitter 225 may include a PDCCH transmitter 227 and a PDSCH transmitter 229. The UL receiver 233 may include a PUCCH receiver 235 and a PUSCH receiver 237.

The higher layer processor 223 may manage physical layer's behaviors (the DL transmitter's and the UL receiver's behaviors) and provide higher layer parameters to the physical layer. The higher layer processor 223 may obtain transport blocks from the physical layer. The higher layer processor 223 may send/acquire higher layer messages such as an RRC message and MAC message to/from a UE's higher layer. The higher layer processor 223 may provide the PDSCH transmitter transport blocks and provide the PDCCH transmitter transmission parameters related to the transport blocks.

The DL transmitter 225 may multiplex downlink physical channels and downlink physical signals (including reservation signal) and transmit them via transmission antennas 231. The UL receiver 233 may receive multiplexed uplink physical channels and uplink physical signals via receiving antennas 231 and de-multiplex them. The PUCCH receiver 235 may provide the higher layer processor 223 UCI. The PUSCH receiver 237 may provide the higher layer processor 223 received transport blocks.

Figure 3:
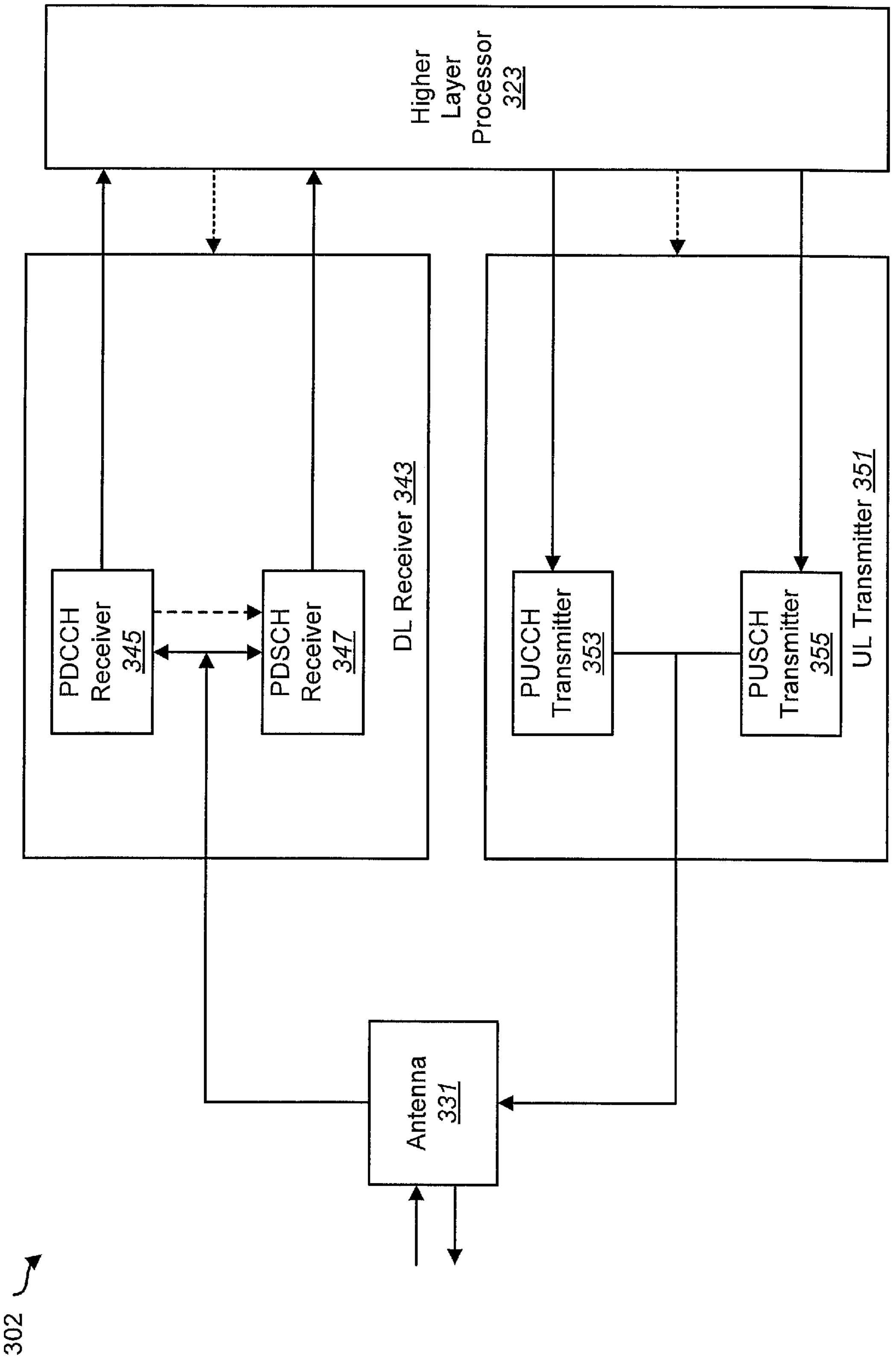
FIG. 3 is a block diagram illustrating one implementation of a UE.

FIG. 3 is a block diagram illustrating one implementation of a UE 302. The UE 302 may be implemented in accordance with the UE 102 described in connection with FIG. 1 in some examples, and/or may perform one or more of the functions described herein. The UE 302 may include a higher layer processor 323, a UL transmitter 351, a DL receiver 343, and one or more antenna 331. The UL transmitter 351 may include a PUCCH transmitter 353 and a PUSCH transmitter 355. The DL receiver 343 may include a PDCCH receiver 345 and a PDSCH receiver 347.

The higher layer processor 323 may manage physical layer's behaviors (the UL transmitter's and the DL receiver's behaviors) and provide higher layer parameters to the physical layer. The higher layer processor 323 may obtain transport blocks from the physical layer. The higher layer processor 323 may send/acquire higher layer messages such as an RRC message and MAC message to/from a UE's higher layer. The higher layer processor 323 may provide the PUSCH transmitter transport blocks and provide the PUCCH transmitter 353 UCI.

The DL receiver 343 may receive multiplexed downlink physical channels and downlink physical signals via receiving antennas 331 and de-multiplex them. The PDCCH receiver 345 may provide the higher layer processor 323 DCI. The PDSCH receiver 347 may provide the higher layer processor 323 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 4:
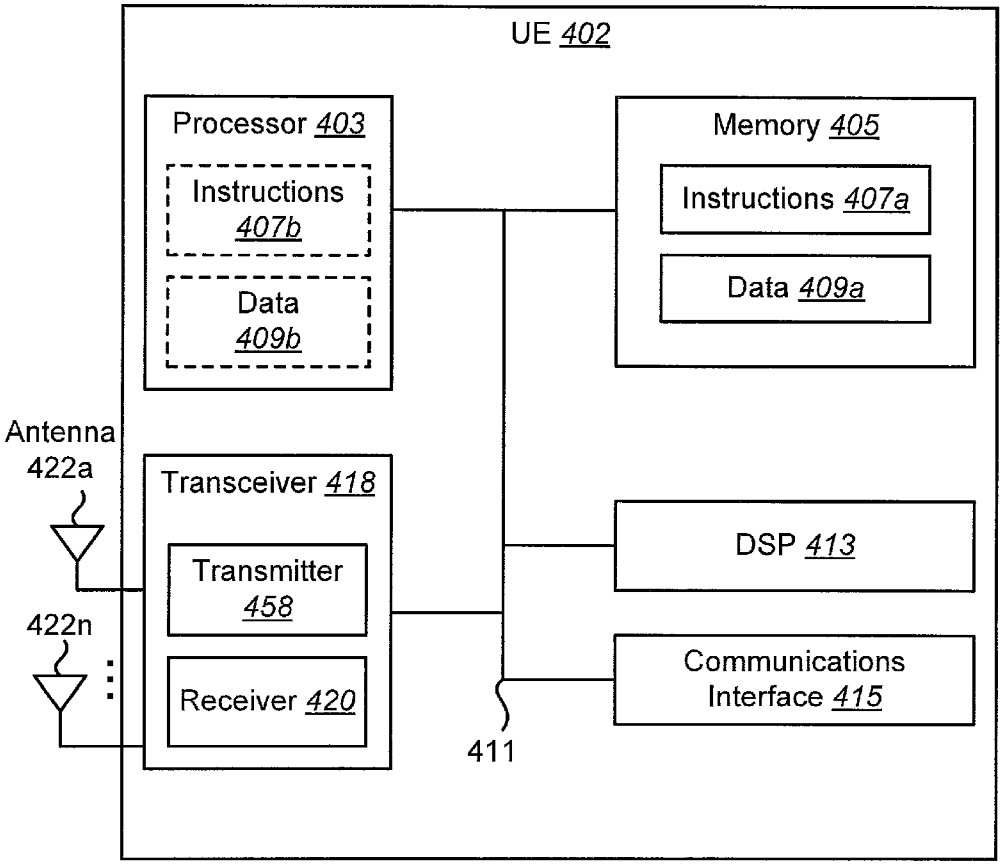
FIG. 4 illustrates various components that may be utilized in a UE.

FIG. 4 illustrates various components that may be utilized in a UE 402. The UE 402 described in connection with FIG. 4 may be implemented in accordance with the UE 102 described in connection with FIG. 1. In some examples, the UE 402 may perform one or more of the methods, approaches, functions, operations, and/or examples, etc., described herein. The UE 402 includes a processor 403 that controls operation of the UE 402. The processor 403 may also be referred to as a central processing unit (CPU). Memory 405, which may include read-only memory (ROM), random access memory (RAM), a combination of the two or any type of device that may store information, provides instructions 407*a* and data 409*a* to the processor 403. A portion of the memory 405 may also include non-volatile random-access memory (NVRAM). Instructions 407*b* and data 409*b* may also reside in the processor 403. Instructions 407*b* and/or data 409*b* loaded into the processor 403 may also include instructions 407*a* and/or data 409*a* from memory 405 that were loaded for execution or processing by the processor 403. The instructions 407*b* may be executed by the processor 403 to implement one or more of the methods, approaches, functions, operations, and/or examples described above.

The UE 402 may also include a housing that contains one or more transmitters 458 and one or more receivers 420 to allow transmission and reception of data. The transmitter(s) 458 and receiver(s) 420 may be combined into one or more transceivers 418. One or more antennas 422*a-n* are attached to the housing and electrically coupled to the transceiver 418.

The various components of the UE 402 are coupled together by a bus system 411, which may include a power bus, a control signal bus, and a status signal bus, in addition to a data bus. However, for the sake of clarity, the various buses are illustrated in FIG. 4 as the bus system 411. The UE 402 may also include a digital signal processor (DSP) 413 for use in processing signals. The UE 402 may also include a communications interface 415 that provides user access to the functions of the UE 402. The UE 402 illustrated in FIG. 4 is a functional block diagram rather than a listing of specific components.

Figure 5:
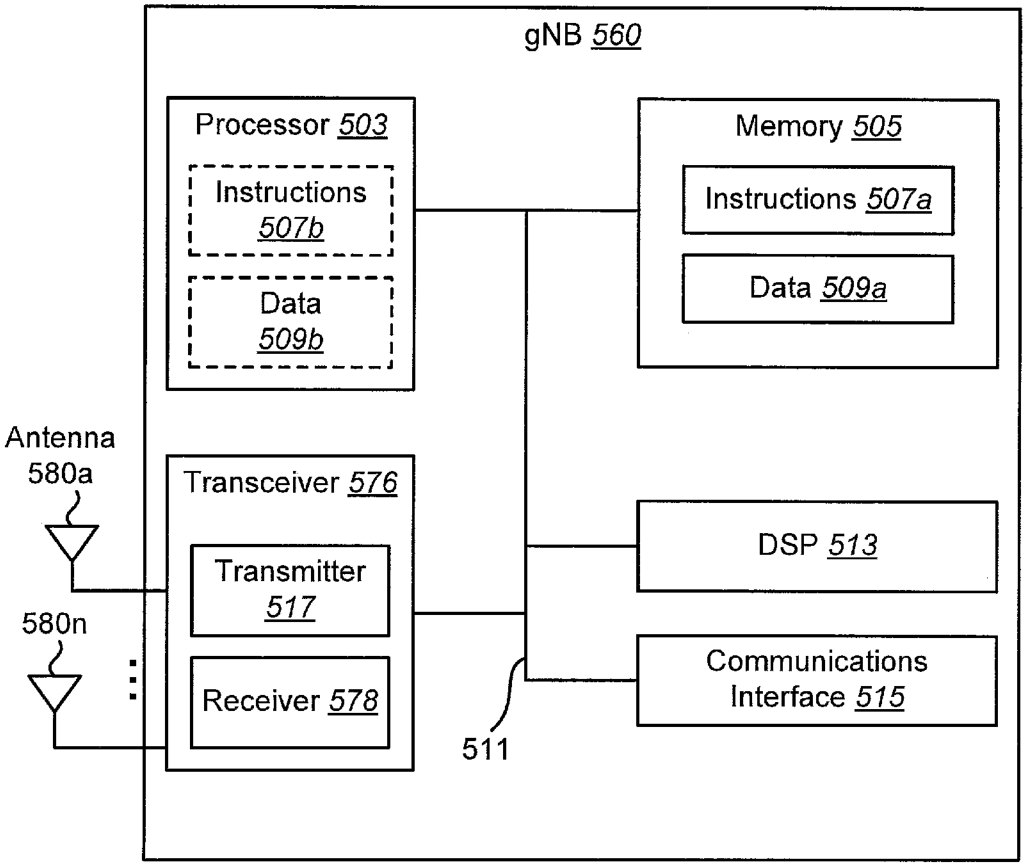
FIG. 5 illustrates various components that may be utilized in a gNB.

FIG. 5 illustrates various components that may be utilized in a gNB 560. The gNB 560 described in connection with FIG. 5 may be implemented in accordance with the gNB 160 described in connection with FIG. 1. In some examples, the gNB 560 may perform one or more of the methods, functions, operations, and/or examples, etc., described herein. The gNB 560 includes a processor 503 that controls operation of the gNB 560. The processor 503 may also be referred to as a central processing unit (CPU). Memory 505, which may include read-only memory (ROM), random access memory (RAM), a combination of the two or any type of device that may store information, provides instructions 507*a* and data 509*a* to the processor 503. A portion of the memory 505 may also include non-volatile random-access memory (NVRAM). Instructions 507*b* and data 509*b* may also reside in the processor 503. Instructions 507*b* and/or data 509*b* loaded into the processor 503 may also include instructions 507*a* and/or data 509*a* from memory 505 that were loaded for execution or processing by the processor 503. The instructions 507*b* may be executed by the processor 503 to implement one or more of the methods, approaches, functions, operations, and/or examples described above.

The gNB 560 may also include a housing that contains one or more transmitters 517 and one or more receivers 578 to allow transmission and reception of data. The transmitter(s) 517 and receiver(s) 578 may be combined into one or more transceivers 576. One or more antennas 580*a-n* are attached to the housing and electrically coupled to the transceiver 576.

The various components of the gNB 560 are coupled together by a bus system 511, which may include a power bus, a control signal bus, and a status signal bus, in addition to a data bus. However, for the sake of clarity, the various buses are illustrated in FIG. 5 as the bus system 511. The gNB 560 may also include a digital signal processor (DSP) 513 for use in processing signals. The gNB 560 may also include a communications interface 515 that provides user access to the functions of the gNB 560. The gNB 560 illustrated in FIG. 5 is a functional block diagram rather than a listing of specific components.

Figure 6:
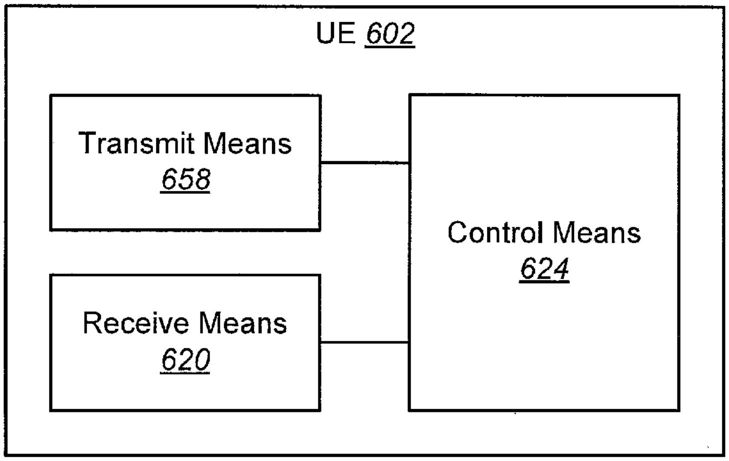
FIG. 6 is a block diagram illustrating one implementation of a UE in which the systems and methods described herein may be implemented.

FIG. 6 is a block diagram illustrating one implementation of a UE 602 in which the systems and methods described herein may be implemented. The UE 602 includes transmit means 658, receive means 620 and control means 624. The transmit means 658, receive means 620 and control means 624 may be configured to perform one or more of the functions described in connection with FIG. 1 above. FIG. 4 above illustrates one example of a concrete apparatus structure of FIG. 6. Other various structures may be implemented to realize one or more of the functions of FIG. 1. For example, a DSP may be realized by software.

Figure 7:
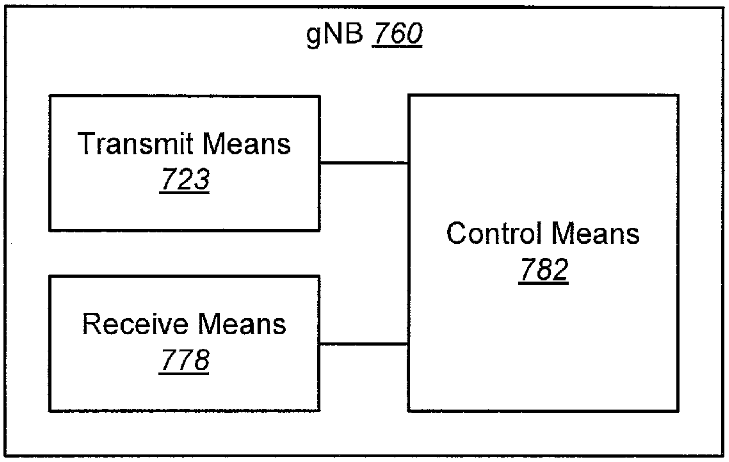
FIG. 7 is a block diagram illustrating one implementation of a gNB in which the systems and methods described herein may be implemented.

FIG. 7 is a block diagram illustrating one implementation of a gNB 760 in which the systems and methods described herein may be implemented. The gNB 760 includes transmit means 723, receive means 778 and control means 782. The transmit means 723, receive means 778 and control means 782 may be configured to perform one or more of the functions described in connection with FIG. 1 above. FIG. 5 above illustrates one example of a concrete apparatus structure of FIG. 7. Other various structures may be implemented to realize one or more of the functions of FIG. 1. For example, a DSP may be realized by software.

Some examples of the techniques described herein may provide one or more approaches for collision resolution between multiple high priority HARQ-ACK and a high priority PUSCH. For intra-UE collision resolution, the uplink channels with the same priority may be performed first. For uplink channels with high priority (e.g., priority index 1), the PUCCH for HARQ-ACK may be configured with a subslot structure. In some examples, the PUSCH scheduling may be more flexible and no subslot may be defined. Thus, potentially, more than one HP PUCCH with HP HARQ-ACK may overlap with a HP PUSCH.

In some examples (e.g., examples where Rel-15 intra-UE UCI multiplexing timeline may be applicable for collision resolution in Rel-17), HP HARQ-ACK multiplexing on HP PUSCH may be performed. One or more approaches may be implemented to handle the potential multiple HP HARQ-ACK multiplexing on a single HP PUSCH case.

FIG. 8A is a diagram illustrating an example of HARQ-ACK multiplexing on a PUSCH without frequency hopping. For instance, FIG. 8A illustrates an arrangement of demodulation reference signal(s) (DMRS), HARQ-ACK multiplexed on PUSCH, and PUCCH with HARQ-ACK for PUSCH without frequency hopping as described in relation to FIG. 1.

FIG. 8B is a diagram illustrating an example of HARQ-ACK multiplexing on a PUSCH with frequency hopping. For instance, FIG. 8B illustrates an arrangement of DMRS, HARQ-ACK multiplexed on PUSCH, and PUCCH with HARQ-ACK for PUSCH with frequency hopping as described in relation to FIG. 1.

FIG. 9 is a diagram illustrating an example of multiple HP PUCCHs for HP HARQ-ACK overlapping with a LP PUSCH and/or a HP PUSCH. For instance, FIG. 9 illustrates an example of HP HARQ-ACK reporting on HP PUCCH with a HP PUCCH configuration with a 2-symbol subslot, LP PUSCH, and/or HP PUSCH as described in relation to FIG. 1.

Figure 10:
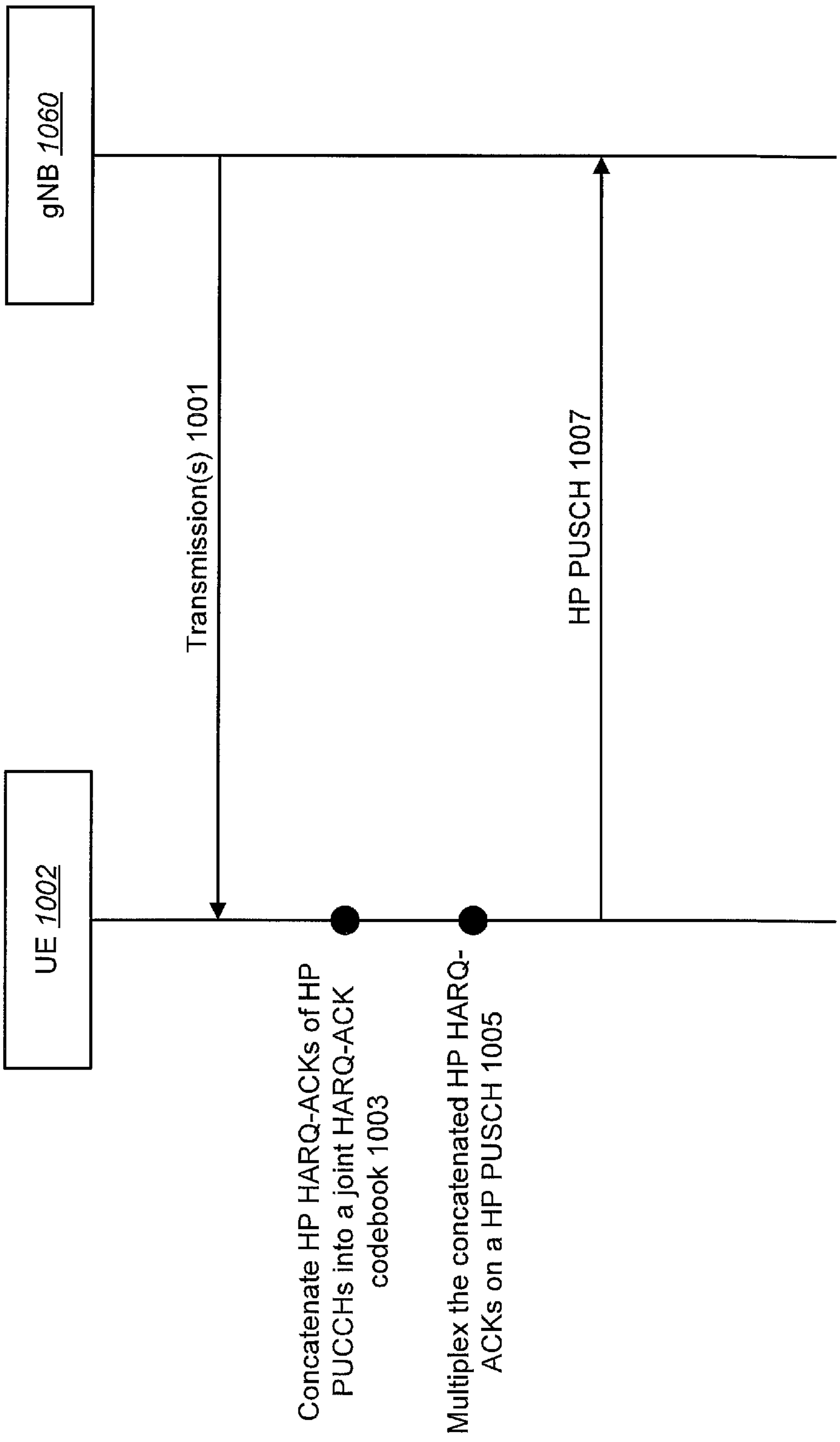
FIG. 10 is a thread diagram illustrating an example of an approach for collision resolution in accordance with some of the techniques described herein.

FIG. 10 is a thread diagram illustrating an example of an approach for collision resolution in accordance with some of the techniques described herein. For instance, FIG. 10 illustrates an example of approach 1 described in relation to FIG. 1. FIG. 10 illustrates a UE 1002 and a gNB 1060. The UE 1002 may be an example of the UE 102 described in relation to FIG. 1. The gNB 1060 may be an example of the gNB 160 described in relation to FIG. 1.

In this example, the gNB 1060 may send one or more transmissions 1001. The transmission(s) 1001 may include configuration (e.g., scheduling) information and/or data. For instance, the gNB 1060 may send information to the UE 1002 indicating a configuration for collision resolution.

In some examples, the UE 1002 and/or the gNB 1060 may determine that a PUSCH with HP (e.g., priority index 1) overlaps with multiple HP PUCCHs carrying HP HARQ-ACKs. For instance, the gNB 1060 may schedule a HP PUSCH and/or may schedule multiple HP PUCCHs (e.g., more than one HP PUCCH) carrying HP HARQ-ACKs, where the HP PUCCHs overlap with the HP PUSCH. In some examples, the UE 1002 may receive scheduling information that may schedule a HP PUSCH and/or may schedule multiple HP PUCCHs carrying HP HARQ-ACKs, where the HP PUCCHs overlap with the HP PUSCH.

In approach 1, joint coding and RE mapping of HP HARQ-ACK from all overlapping HP PUCCHs may be performed. For example, the UE 1002 may concatenate 1003 HP HARQ-ACKs carried in the multiple HP PUCCHs (e.g., overlapping HP PUCCHs) into a joint HARQ-ACK codebook. The UE 1002 may multiplex 1005 the concatenated HARQ-ACK bits on a HP PUSCH. The UE 1002 may send 1007, to the gNB 1060, a HP PUSCH including the multiplexed concatenated HARQ-ACKs.

Figure 11:
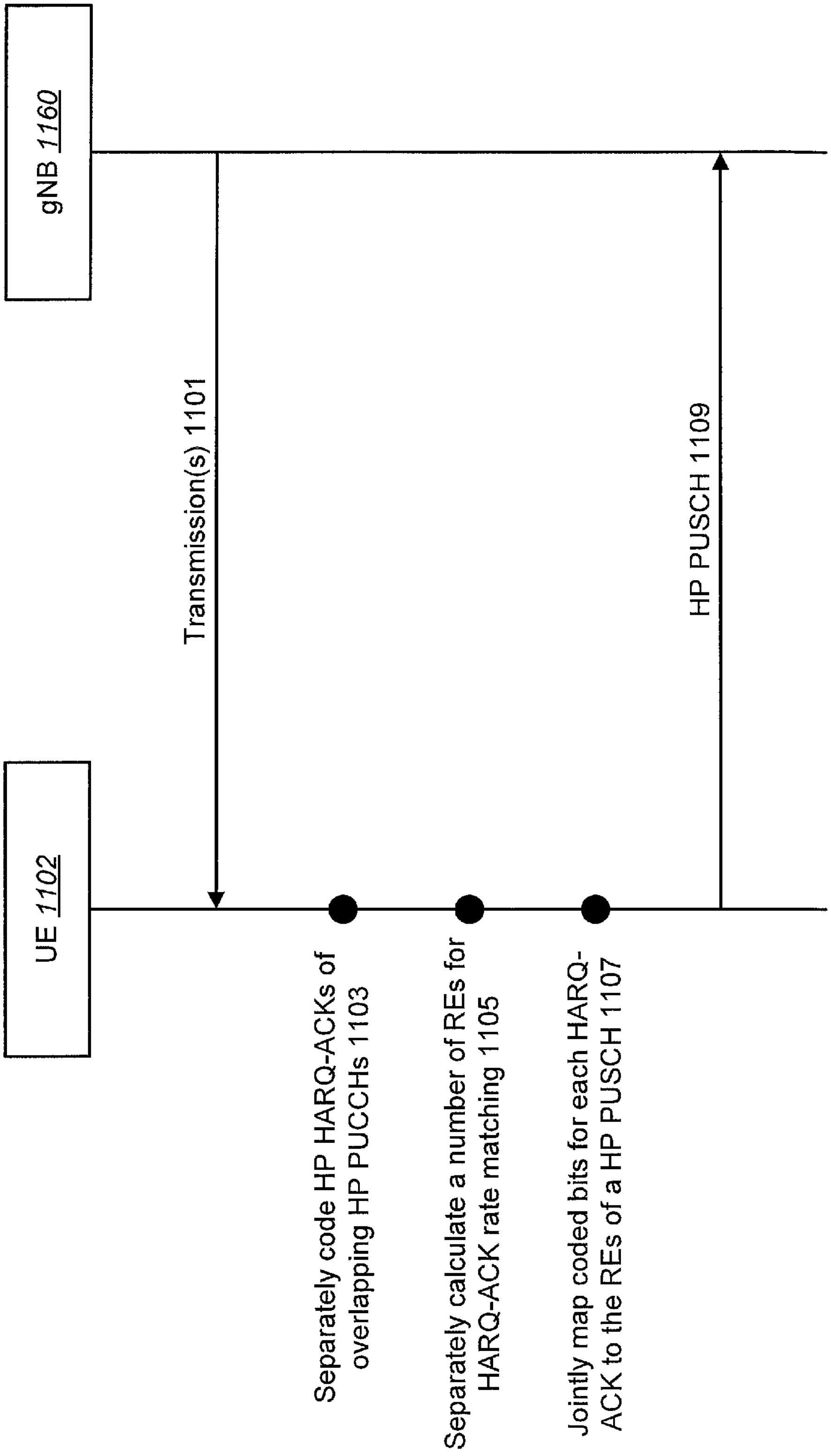
FIG. 11 is a thread diagram illustrating an example of another approach for collision resolution in accordance with some of the techniques described herein.

FIG. 11 is a thread diagram illustrating an example of another approach for collision resolution in accordance with some of the techniques described herein. For instance, FIG. 11 illustrates an example of approach 2 described in relation to FIG. 1. FIG. 11 illustrates a UE 1102 and a gNB 1160. The UE 1102 may be an example of the UE 102 described in relation to FIG. 1. The gNB 1160 may be an example of the gNB 160 described in relation to FIG. 1.

In this example, the gNB 1160 may send one or more transmissions 1101. The transmission(s) 1101 may include configuration (e.g., scheduling) information and/or data. For instance, the gNB 1160 may send information to the UE 1102 indicating a configuration for collision resolution.

In some examples, the UE 1102 and/or the gNB 1160 may determine that a PUSCH with HP (e.g., priority index 1) overlaps with multiple HP PUCCHs carrying HP HARQ-ACKs. For instance, the gNB 1160 may schedule a HP PUSCH and/or may schedule multiple HP PUCCHs (e.g., more than one HP PUCCH) carrying HP HARQ-ACKs, where the HP PUCCHs overlap with the HP PUSCH. In some examples, the UE 1102 may receive scheduling information that may schedule a HP PUSCH and/or may schedule multiple HP PUCCHs carrying HP HARQ-ACKs, where the HP PUCCHs overlap with the HP PUSCH.

In approach 2, the UE 1102 may perform separate coding with joint RE mapping of HP HARQ-ACK from all overlapping HP PUCCHs. For instance, the UE 1102 may separately code 1103 the HP HARQ-ACK in each overlapping HP PUCCH. The UE 1102 may separately calculate 1105 the number of REs for the HARQ-ACK rate matching output. The UE 1102 may jointly map 1107 the coded bits after rate matching for each HARQ-ACK to the RE resources following the PUCCH ordering. The UE 1102 may send the HP PUSCH 1109 (including the jointly mapped coded bits, for instance) to the gNB 1160.

Figure 12:
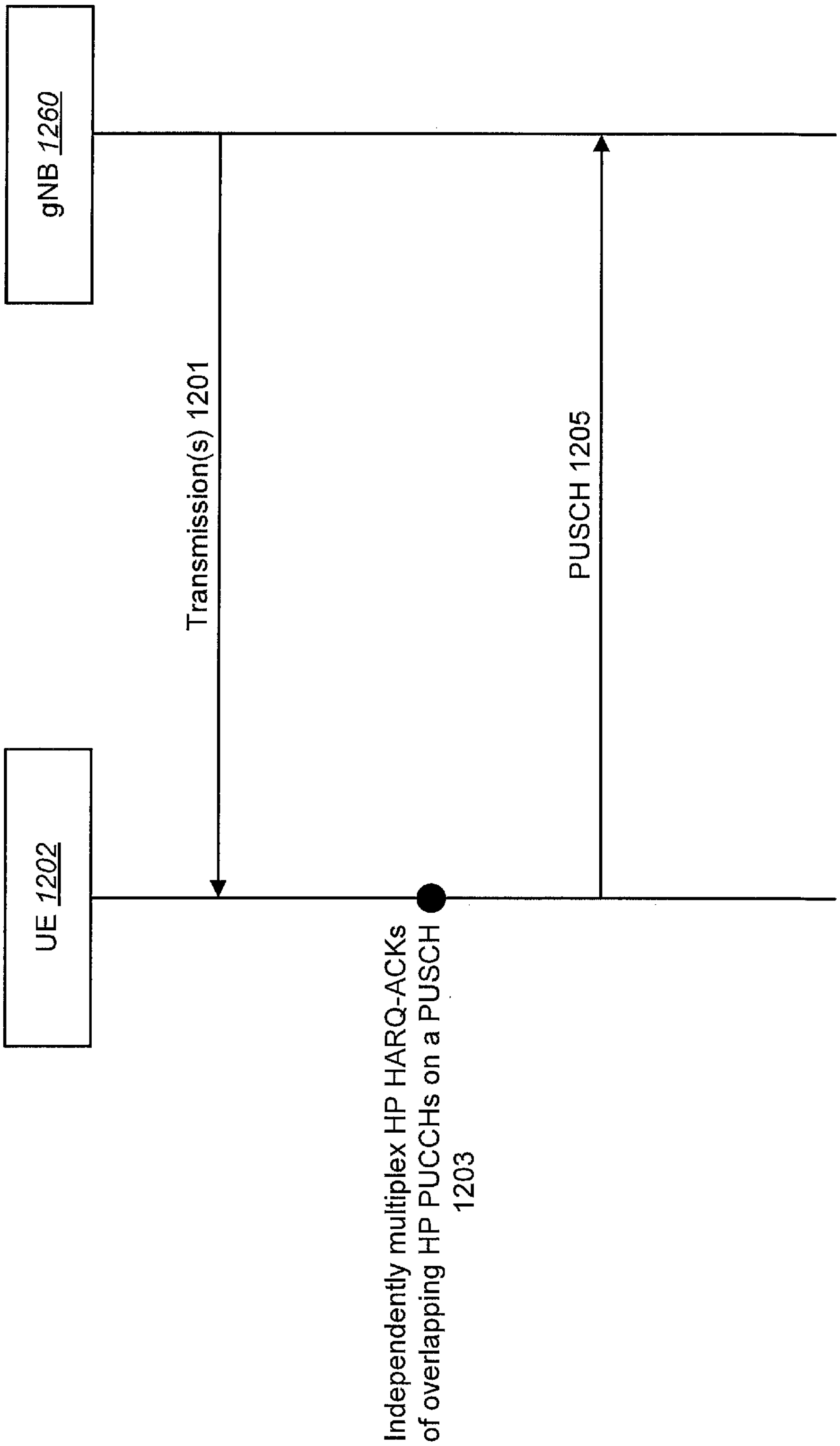
FIG. 12 is a thread diagram illustrating an example of another approach for collision resolution in accordance with some of the techniques described herein.

FIG. 12 is a thread diagram illustrating an example of another approach for collision resolution in accordance with some of the techniques described herein. For instance, FIG. 12 illustrates an example of approach 3 described in relation to FIG. 1. FIG. 12 illustrates a UE 1202 and a gNB 1260. The UE 1202 may be an example of the UE 102 described in relation to FIG. 1. The gNB 1260 may be an example of the gNB 160 described in relation to FIG. 1.

In this example, the gNB 1260 may send one or more transmissions 1201. The transmission(s) 1201 may include configuration (e.g., scheduling) information and/or data. For instance, the gNB 1260 may send information to the UE 1202 indicating a configuration for collision resolution.

In some examples, the UE 1202 and/or the gNB 1260 may determine that a PUSCH with HP (e.g., priority index 1) overlaps with multiple HP PUCCHs carrying HP HARQ-ACKs. For instance, the gNB 1260 may schedule a HP PUSCH and/or may schedule multiple HP PUCCHs (e.g., more than one HP PUCCH) carrying HP HARQ-ACKs, where the HP PUCCHs overlap with the HP PUSCH. In some examples, the UE 1202 may receive scheduling information that may schedule a HP PUSCH and/or may schedule multiple HP PUCCHs carrying HP HARQ-ACKs, where the HP PUCCHs overlap with the HP PUSCH.

In approach 3, the HP HARQ-ACK of each overlapping PUCCH may be multiplexed on a HP PUSCH independently on the PUSCH. To maintain the HARQ-ACK timeline of each overlapping HP PUCCH, a different UCI multiplexing approach may be used. The multiplexing symbols for the HP HARQ-ACK of an overlapping HP PUCCH may be confined such that no overlapping occurs between the multiplexed HP HARQ-ACK bits from different HP PUCCHs. For example, the UE 1202 may independently multiplex 1203 HP HARQ-ACKs of overlapping HP PUCCHs on a PUSCH. The UE 1202 may send 1205, to the gNB 1260, a PUSCH (e.g., HP PUSCH) including the multiplexed HARQ-ACKs.

Figure 13:
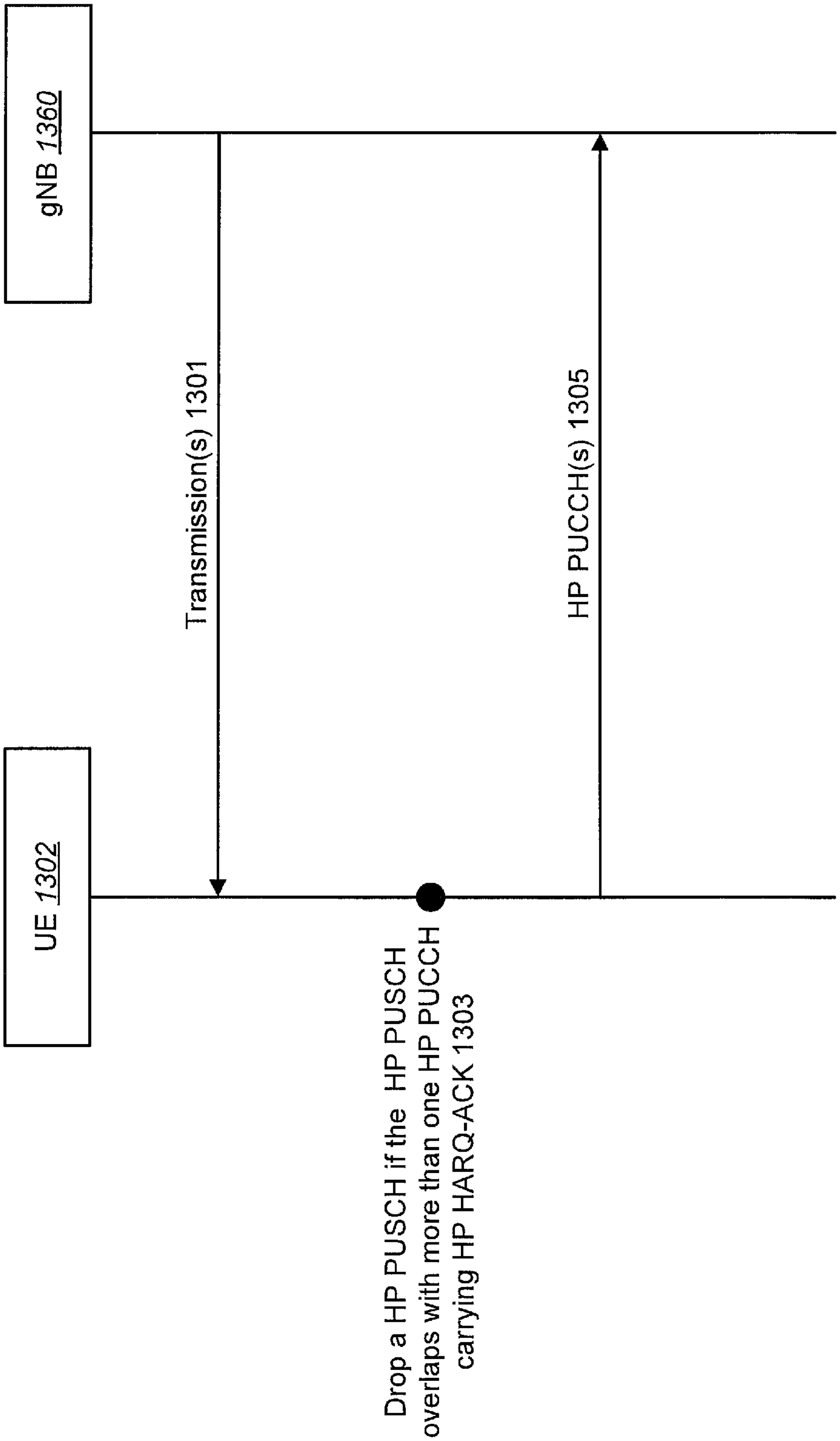
FIG. 13 is a thread diagram illustrating an example of another approach for collision resolution in accordance with some of the techniques described herein.

FIG. 13 is a thread diagram illustrating an example of another approach for collision resolution in accordance with some of the techniques described herein. For instance, FIG. 13 illustrates an example of approach 4 described in relation to FIG. 1. FIG. 13 illustrates a UE 1302 and a gNB 1360. The UE 1302 may be an example of the UE 102 described in relation to FIG. 1. The gNB 1360 may be an example of the gNB 160 described in relation to FIG. 1.

In this example, the gNB 1360 may send one or more transmissions 1301. The transmission(s) 1301 may include configuration (e.g., scheduling) information and/or data. For instance, the gNB 1360 may send information to the UE 1302 indicating a configuration for collision resolution.

In some examples, the UE 1302 and/or the gNB 1360 may determine that a PUSCH with HP (e.g., priority index 1) overlaps with multiple HP PUCCHs carrying HP HARQ-ACKs. For instance, the gNB 1360 may schedule a HP PUSCH and/or may schedule multiple HP PUCCHs (e.g., more than one HP PUCCH) carrying HP HARQ-ACKs, where the HP PUCCHs overlap with the HP PUSCH. In some examples, the UE 1302 may receive scheduling information that may schedule a HP PUSCH and/or may schedule multiple HP PUCCHs carrying HP HARQ-ACKs, where the HP PUCCHs overlap with the HP PUSCH.

In approach 4, the UE 1302 may drop the HP PUSCH, and transmit all overlapping HP PUCCH. For example, the UE 1302 may drop 1303 a HP PUSCH if the HP PUSCH overlaps with more than one HP PUCCH carrying HP HARQ-ACK. The UE 1302 may send 1305 all HP PUCCHs with HP HARQ-ACKs to the gNB 1360.

Figure 14:
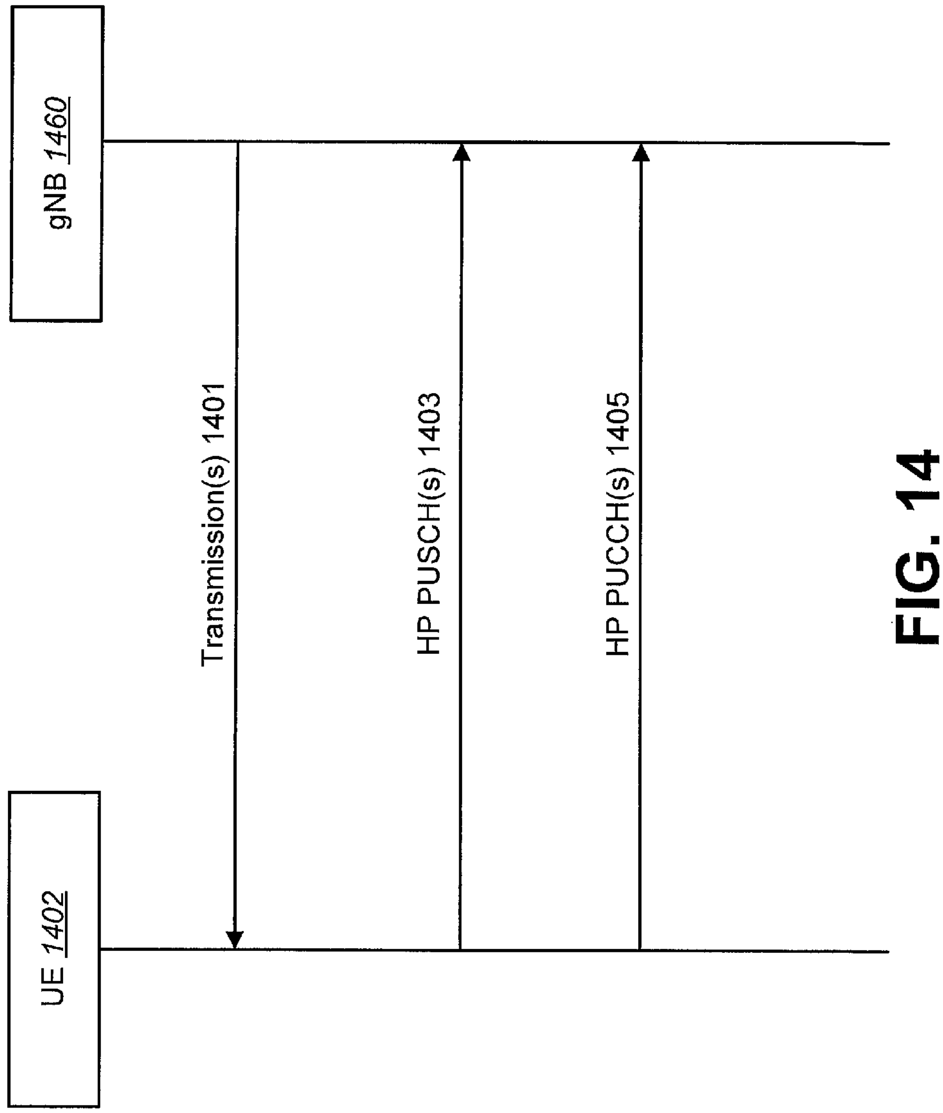
FIG. 14 is a thread diagram illustrating an example of another approach for collision avoidance in accordance with some of the techniques described herein.

FIG. 14 is a thread diagram illustrating an example of another approach for collision avoidance in accordance with some of the techniques described herein. For instance, FIG.

14 illustrates an example of approach 5 described in relation to FIG. 1. FIG. 14 illustrates a UE 1402 and a gNB 1460. The UE 1402 may be an example of the UE 102 described in relation to FIG. 1. The gNB 1460 may be an example of the gNB 160 described in relation to FIG. 1.

In this example, the gNB 1460 may send one or more transmissions 1401. The transmission(s) 1401 may include configuration (e.g., scheduling) information and/or data. For instance, the gNB 1460 may send information to the UE 1402 indicating a schedule for collision avoidance.

In approach 5, some restrictions or unexpected conditions on scheduling may be provided to avoid collision. For instance, it may be considered an error case if a HP PUSCH overlaps with more than one HP PUCCH carrying HP HARQ-ACK. In this example, the UE 1402 may not be expected to have a HP PUSCH overlapping with more than one HP PUCCH carrying HARQ-ACK. In some examples, the transmission(s) 1401 may schedule the HP PUSCH and HP HARQ-ACK feedback on HP PUCCH such that collisions will not occur (e.g., to avoid overlap between the HP PUSCH and more than one HP PUCCH carrying HP HARQ-ACK). The UE 1402 may send 1403 one or more HP PUSCH(s) to the gNB 1460. The UE 1402 may send 1405 one or more HP PUCCHs with HP HARQ-ACKs to the gNB 1460.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a micro-controller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

What is claimed is:

1. A user equipment (UE), comprising:

a processor configured to:

determine that a physical uplink shared channel (PUSCH) with high priority (HP) overlaps with a HP physical uplink control channels (PUCCHs) carrying HP hybrid automatic repeat request-acknowledgements (HARQ-ACKs), wherein the UE does not expect to transmit another PUCCH carrying HP HARQ-ACK that overlaps with the HP PUSCH; and multiplex the HP HARQ-ACK from the overlapping HP PUCCH on the HP PUSCH.

2. A base station (gNB), comprising:

a processor configured to:

determine that a physical uplink shared channel (PUSCH) with high priority (HP) overlaps with a HP physical uplink control channels (PUCCHs) carrying HP hybrid automatic repeat request-acknowledgements (HARQ-ACKs);

do not schedule another PUCCH transmission with HP HARQ-ACK that overlaps with the HP PUSCH; and receive the HP PUSCH, wherein the HP PUSCH comprises the HP HARQ-ACK of the overlapping PUCCH.

3. A method by a user equipment (UE), comprising:

determining that a physical uplink shared channel (PUSCH) with high priority (HP) overlaps with a HP physical uplink control channels (PUCCHs) carrying HP hybrid automatic repeat request-acknowledgements (HARQ-ACKs), wherein the UE does not expect to transmit another PUCCH carrying HP HARQ-ACK that overlaps with the HP PUSCH; and multiplexing the HP HARQ-ACK from the overlapping HP PUCCH on the HP PUSCH.

* * * * *